United States Patent [19]

Bly

[11] Patent Number: 5,427,033
[45] Date of Patent: Jun. 27, 1995

[54] TRUNK MOUNTED STORAGE TABLE

[76] Inventor: Rodney A. Bly, 3710 Hampton, Royal Oak, Mich. 48073

[21] Appl. No.: 54,553

[22] Filed: May 3, 1993

[51] Int. Cl.⁶ .............................................. A47B 23/00
[52] U.S. Cl. ........................................................ 108/44
[58] Field of Search ...................... 108/44, 46, 47, 40; 296/26, 37.5; 224/42.03 R, 311, 46, 43

[56] References Cited

U.S. PATENT DOCUMENTS

| | | | |
|---|---|---|---|
| 3,164,109 | 1/1965 | Atkinson | 108/44 |
| 3,266,443 | 8/1966 | Lee | 108/46 |
| 3,705,300 | 12/1972 | Anderson | 108/44 |
| 3,709,159 | 1/1973 | Oglesby, Jr. | 108/44 |
| 4,086,859 | 5/1978 | Dondero | 108/44 X |
| 4,494,465 | 1/1985 | Fick, Jr. | 108/44 |
| 4,830,243 | 5/1989 | Mann | 108/44 X |
| 4,962,709 | 10/1990 | Huber | 108/44 |

Primary Examiner—Jose V. Chen
Attorney, Agent, or Firm—Gifford, Krass, Groh, Sprinkle, Patmore, Anderson & Citkowski

[57] ABSTRACT

A folding table which may be stored in the trunk of a vehicle. The folding table includes main and auxiliary table sections pivotally mounted to each other along first edges thereof. A first brace is mounted to the underside of the main table section proximate the first edge thereof. A second brace is pivotally mounted to the table proximate a second, opposed edge thereof, and also pivotally mounted to the floor of the trunk of the automobile. The folding table moves from a first, storage position, wherein the components lie substantially flat on the floor of the trunk, to an extended position wherein the main table section is supported by the first brace over the rear bumper of the vehicle, the auxiliary and main table sections unfolding to form an extended table surface.

11 Claims, 4 Drawing Sheets

TRUNK MOUNTED STORAGE TABLE

FIELD OF THE INVENTION

This invention concerns the field of folding tables, and, more particularly, to such a table which may be stored in the trunk of an automobile when not in use and unfolded therefrom when in use.

DESCRIPTION OF THE RELEVANT PRIOR ART

The usefulness of a table which may be folded into the trunk of an automobile for storage and unfolded therefrom when the automobile is parked to provide a portable, outdoor table is obvious. Such a device is particularly useful for what are commonly known as "tailgate" parties, typically occurring in the parking lot and surrounding areas of sport stadiums, so that the spectators can enjoy a picnic meal before the game. Of course, a folding table is also useful in any general camping situation.

Not surprisingly, a number of approaches have been used to construct such a folding table, some of which are disclosed in the following U.S. Pat. Nos.: 5,136,953; 4,887,526; 4,494,465; 4,555,948; 4,452,151; 4,418,626; and 3,896,742. Most typically, these prior art folding tables, when unfolded, have a pair of legs which extend down to the ground to support the table's surface; see, for example, the '159, '742, '526 and '465 patents listed above. The trunk mounted table disclosed in the '626 patent is supported by legs attached to the opposed edges of the trunk of the automobile. The '151 patent discloses a table with one end attached to the lid of the trunk and the other supported by legs which extend down to the floor of the trunk. The trunk table disclosed in the '948 patent is supported by a pair of lazy tongs which are mounted inside the trunk. The '953 patent discloses a table which is cantileverly mounted by a bracket to the upstanding rear wall of the trunk.

However, all of the known prior art folding tables for use in the trunks of automobiles have one or more disadvantages which have rendered them commercially unacceptable. For example some of them, such as those disclosed the '626, '948, and '953 patents, do not adequately support both ends of the table surface. Others, and most notably '742, disclose structures and mechanisms which are difficult and expensive to manufacture. Yet others, such as '526, are bulky and do not present a flat profile when in storage position in the trunk. Many, if not most of them, are difficult and awkward to set up and move back into the storage position.

What is needed is a folding trunk table which is relatively flat and unobtrusive when in its storage position in the automobile trunk, and, when unfolded, is securely supported at both ends of the table surface. Such a folding table should also be easy to unfold, set up and fold back into the trunk of the automobile. Furthermore, it would be highly desirable if such a folding table were relatively simple in construction and manufacturable from easily available parts so that it could be mass produced for the commercial marketplace.

SUMMARY OF THE INVENTION

The folding table of the present invention has been designed to overcome all of the disadvantages with the prior art noted above. In one aspect of the invention, the folding table includes a flat, main table section having first and second surfaces and a first brace pivotally mounted to the second surface of the main table section proximate an end thereof for supporting the main table section on a rear bumper of an automobile. A second brace is also pivotally mounted to the first table section proximate an opposite end and includes a pair of legs pivotally mounted to the floor of the trunk of the automobile such that the table may be moved from a first, folded position, wherein the second brace is disposed substantially flat on the trunk floor, the main table section is disposed with its first surface against the trunk floor, and the first brace rests on the second or bottom surface of the main table section, to an unfolded position wherein the table is cantileverly supported over the bumper by the first brace with its first or top surface exposed.

In a further aspect of the present invention, an auxiliary table section is also provided to increase the table area available when the table is unfolded. The auxiliary table section also has first (top) and second (bottom) surfaces and is pivotally mounted proximate an edge thereof to an edge of the first end of said main table section such that, when the table is in the first position, the main table section rests on the auxiliary table section with their respective first or top surfaces folded together. When the table is unfolded into the second position, the auxiliary table section pivotally unfolds so that its first surface acts as an extension of the first surface of the main table surface. In order to support the auxiliary table section when the table of the present invention is unfolded, a pair of slide supports are provided which are mounted on the bottom or second surface of the main table section proximate side edges thereof. When the table is in the first or folded position, the slide supports are slidingly disposed on the second surface of the main table section. When the table is unfolded, the slide supports extend to support a portion of the auxiliary table section.

The first brace may be configured to include a cross piece which extends across the main table section and a pair of legs extending from the cross piece, each of the legs terminating in free ends, the free ends including means for engaging the bumper of the car.

The second brace may be provided with an auxiliary brace pivotally mounted to the legs of the second brace. The auxiliary brace includes a pair of opposed legs and a connecting cross piece which engages with the floor and/or back wall of the trunk to give the folding table further support.

Furthermore, each of first, second and auxiliary braces may be made adjustable by constructing the legs in the following manner: the general construction of the various braces of this embodiment of the present invention is tubular, and the legs of each of the braces is made of two telescoping sections, one of the sections being slidingly disposed in the other of the sections. Means are provided for fixing the position of the two telescopic sections relative to each other at a selected length. In this manner, each of the legs of each of the braces can be lengthened or shortened. The utility of this feature will be amplified upon in the detailed description of the invention to follow.

In yet another embodiment of the folding table of the present invention, each of the legs of the second brace terminates in a short, transverse section which is pivotally engageable with a respective U-clamp mounted to the floor of the trunk. Furthermore, one or more releasable storage clamps may be mounted on either the main or auxiliary table section for clamping the two table sections together. The clamps may be used to clamp the table sections together when the table is folded, and then released to permit the table to be unfolded.

BRIEF DESCRIPTION OF THE DRAWINGS

The following detailed description may best be understood by reference to the following drawings in which.

DETAILED DESCRIPTION OF THE PREFERRED EMBODIMENTS

Figure 1:
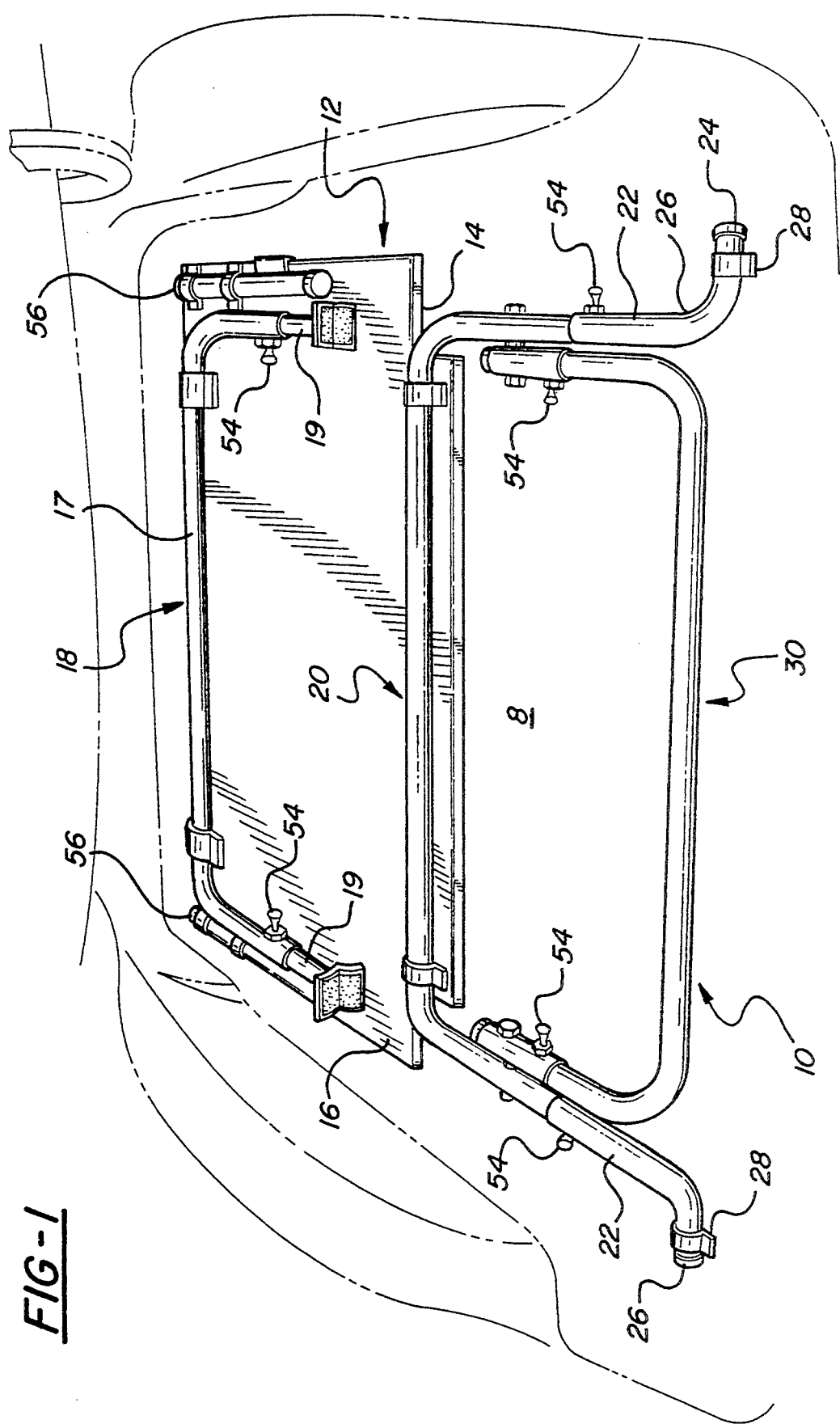
FIG. 1 is a perspective view of a folding table according to the present invention when the table is in its first, folded position in the trunk of an automobile.
Figure 4:
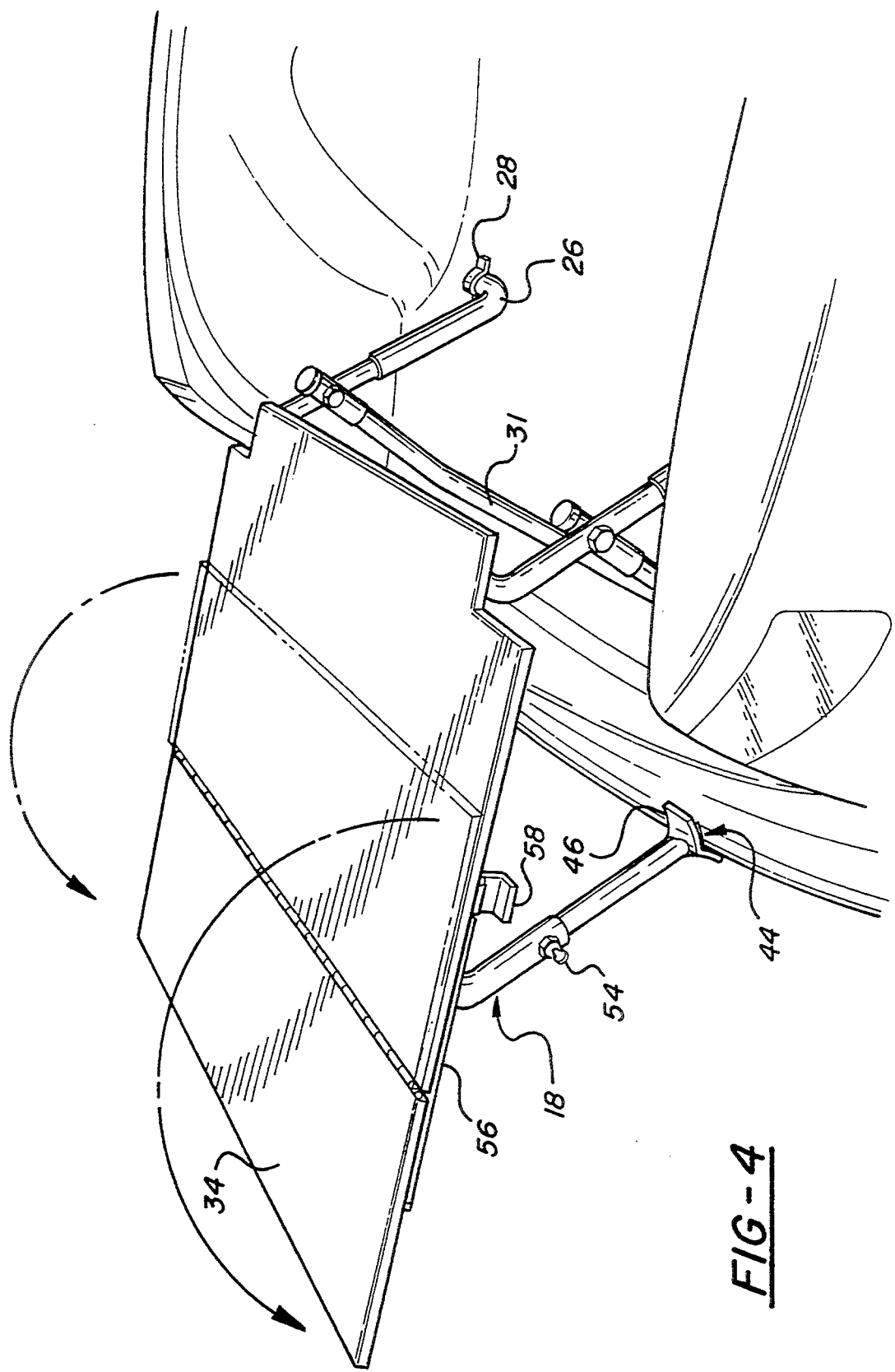
FIG. 4 shows the final, unfolded position of the table of FIG. 1.

Throughout the following detailed description, like numerals are used to reference the same element of the present invention shown in multiple figures thereof. Referring now to the drawings, and in particular to FIGS. 1 and 4, there is shown a folding table 10 constructed according to the present invention in, respectively, its first or folded position and its second or unfolded position. The folding table 10 is mounted to the floor 8 of the trunk 7 of an automobile. The folding table 10 includes a main table section 12 having a first or top surface 14 and a second or bottom surface 16. In FIG. 1, the bottom surface 16 lies uppermost, with the top surface 14 shown against the floor 8 of the trunk 7.

A first brace 18 is pivotally mounted to the second surface 16 of the main table section 12. The first brace 18 includes a cross piece 17 and a pair of opposed legs 19 extending from said cross piece 17. Attached to the end 44 of each first brace leg 19 is an engaging means 46 for engaging the bumper 9 of the car in the manner shown in FIG. 4. Preferably, the first brace 18 is mounted to the main table section 12 proximate a first end edge 38 (seen in FIG. 3) thereof.

Mounted proximate a second end edge 39 (shown in FIG. 3) of main table section 12 is a second brace 20. The second brace 20 also has a pair of opposed legs 22 terminating in short transverse sections 26. U-clamps 28 are mounted to the floor 8 of the trunk 7 for pivotally enclosing the traverse sections 26 of second brace legs 22. In this manner, the second brace 22 is pivotally mounted to the floor 8 of the trunk 7.

Mounted to the second brace 20 is an auxiliary brace 30 which also includes a cross piece 31 and a pair of opposed legs 33 extending therefrom. As can be seen most clearly in FIG. 3, the cross piece 31 of the auxiliary brace 30 rests against the floor 8 of the trunk 7 when the table 10 is in its unfolded position, and preferably also against the back wall of the trunk. Thus, the auxiliary brace 30 serves to brace the second brace 20 when the table 10 has been unfolded.

Figure 3:
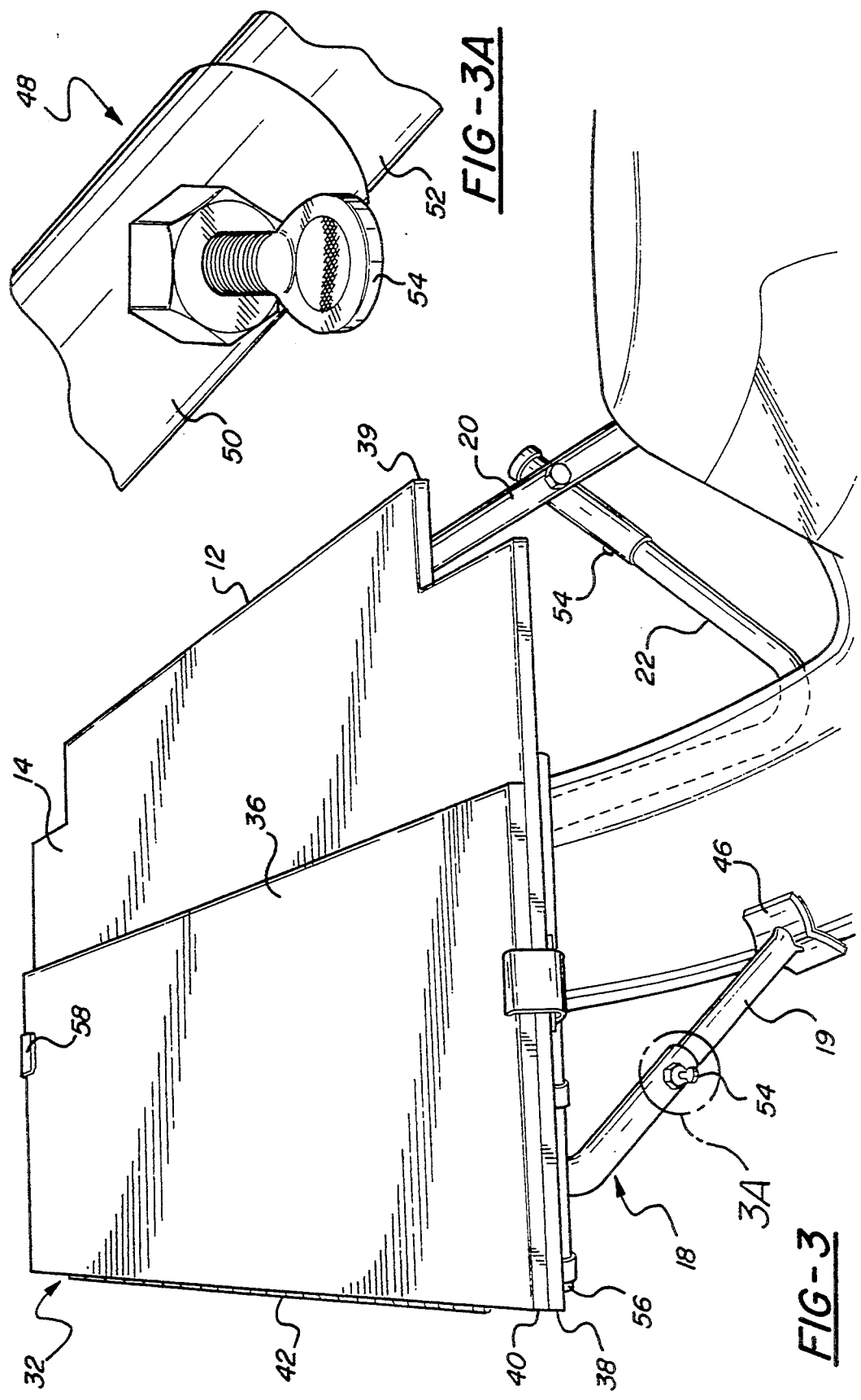
FIG. 3 shows the table of FIG. 1 after it has been unfolded, but before the auxiliary table section is unfolded, FIG. 3A showing a detail of the construction of the braces of the table.

The embodiment depicted in the drawings also includes an auxiliary table section 32 which, optionally, may be unfolded when the table 10 is folded out to its second position. Auxiliary table section 32 is pivotally mounted along a first edge 40 thereof to the first end edge 38 of the main table section, preferably by a means such as a piano hinge 42. Like the main table section 12, auxiliary table section 32 includes a first or top surface 34, and a second, or bottom surface 36. So that auxiliary table section 32 is supported when the table is in the unfolded position shown in FIG. 4, a pair of slide supports 56 are provide which are mounted on the second surface 16 of main table section 12 proximate the sides thereof. In FIGS. 1 and 3, the slide supports are shown in their storage position. In FIG. 4, the slide supports 56 have been slidingly displaced toward unfolded auxiliary table section 32 to serve as a support means therefor. A pair of releasable storage clamps 58 are also mounted on main table section 12. The clamps 58 are used to clamp the main and auxiliary table sections 12, 32 together when the table is in the folded position shown in FIG. 1. As the table 10 is unfolded, the clamps 58 may be released so as to permit auxiliary table section 32 to be unfolded from main table section 12.

The manner of operation of the folding table 10 of the present invention can be seen by sequentially considering FIGS. 1–4. In FIG. 1, the table 10 is in its storage position with the second brace 30 lying substantially flat on the floor 8 of the trunk 7, and the top surface 14 of main table section 12 also resting on the floor of the trunk. In this position the first brace 18 rests on the bottom surface 16 of main table section 12. Although FIG. 1 depicts the folded table 10 as lying completely flat on the floor of the trunk 8, this does not necessarily need to be the case since, if desired, the second brace 30 can be slightly pivoted upward to adjust to smaller size trunks or to accommodate objects stored under the table 10. Hence, by the term "substantially flat," the inventor means that the second brace 30 is disposed either parallel or at a small angle to trunk floor 8.

Figure 2:
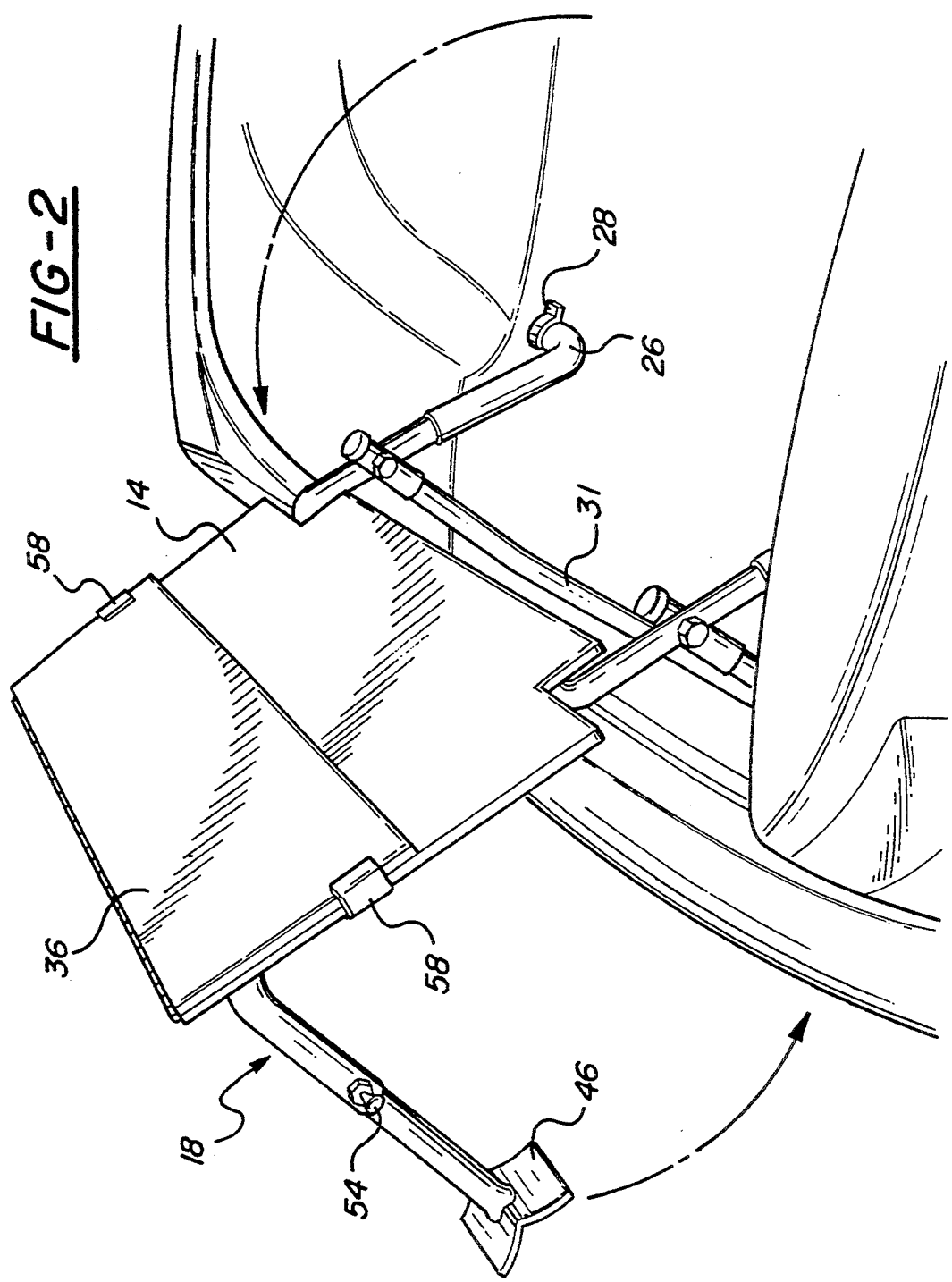
FIG. 2 is similar to FIG. 1 except that it shows an intermediate position of the table as it is being unfolded.

In FIG. 2, an intermediate position of the unfolding table 10 is depicted. In the position depicted, the table has started to be unfolded by pivoting second brace 20 off of trunk floor 8, thus causing the main table section 12 to pivot up off the floor along its second end edge 39 to extend rearward and partially out of the trunk 7, thus causing the pivoting first brace 18 to drop down into a vertical position.

In FIG. 3, the main table section 12 has been pivoted all the way rearward until the first brace 18 is in engagement with the bumper 9. This has caused the second brace 20, which is pivotally attached to the trunk floor 8, to pivot somewhat rearwardly. The auxiliary brace 30 has also pivoted away from the second brace 20 to come to rest on the trunk floor 8. The position of the auxiliary brace cross piece 31 is shown in phantom in FIG. 3, and it can be seen that, by resting against the floor and rear wall of the trunk, it serves to brace the second brace 20 and the second end edge 39 of the main table section 12. The first end edge 38 is supported on the bumper 9 by the first brace 18. Thus, the table 10 is securely supported at both ends entirely upon the vehicle.

If desired, the auxiliary table section 32 may be extended, as has been done in FIG. 4. The arrow shows the direction in which the auxiliary table section 32 has been unfolded. Prior to unfolding the auxiliary table section 32, the sliding supports 56 should be moved into their extended position shown in FIG. 4. Also, the releasable clamps 58 must be opened to release the auxiliary table section 32.

Of course, bumpers and trunks vary in configuration from vehicle to vehicle. Also, the vehicle may be parked on uneven terrain when the users are picnicking.

Therefore, the folding table of the present invention further includes means 48 for adjusting the legs of the various braces. It should be noted that the braces shown in the depicted embodiment are constructed of tubular material, either of a metal such as aluminum, or of a polymer such as PVC. Adjusting means 48 consists of two telescoping portions 50,52 which make up the leg of each brace, one section 52 being slidingly inserted into the other section 50. By sliding the two telescoping sections 50,52 with respect to each other, the length of the respective leg may be lengthened or shortened as desired. A wing nut 54 is also provided for tightening down to fix the properly adjusted position of the two sections 50,52 with respect to each other. Alternatively, both telescoping sections 50,52 may each be provided with a plurality of holes for alignment with each other to lengthen or shorten the length of the leg. A hairpin clip is inserted through the aligned holes to fix the selected length.

By adjusting individually each leg and each brace, the top surfaces 14,34 of the folding table may be leveled as desired. Furthermore, if the rear wall of the trunk of a particular vehicle is higher than is the case with the vehicle pictured in the drawings, the various braces may be adjusted so that the table may be pivoted backward even over a relatively high rear trunk wall. Of course, it would be expected that the owner of the vehicle, when installing the folding table into the trunk, would initially make the correct adjustments to fit the various table structures to the vehicle's trunk so that continual adjustments would not have to be made.

The folding table of the present invention is assembled entirely of either stock components or components which can very easily be manufactured. Thus, as stated before, the various braces may be manufactured from metal or polymeric tubing. The table sections, themselves, can be easily fabricated from stock polymeric sheet material, such as sheet acrylic. Of course, the table sections could also be made from sheet metal, wood, laminate, or any other suitable material. Hence, the folding table of the present invention is relatively simple and easy to manufacture in large volumes and is, therefore, suitable for the mass market. Moreover, as has been described above, it is very simple to use. Of course, the steps outlined above to unfold the table for use are simply reversed when it is desired to fold the table back up into the trunk.

The invention claimed herein has been described with certain embodiments and exemplifications thereof. Doubtless, other design variations may occur to one skilled in the art upon reading the above description. For example, although the embodiment shows the second brace pivotally mounted to the bottom surface of the main table section close to the inboard edge thereof, the brace could equally well be mounted on the edge, itself, in which case the main table section could be configured as an intact square or a rectangle and minus the cut-out corners shown in the depicted embodiment. However, the present invention is not limited to the particular designs and embodiments depicted herein; its scope is limited solely by the claims appended hereto.

I claim:

1. A folding table for storage in the trunk of an automobile comprising:

a flat, main table section having first top and second bottom surfaces and first and second ends;

a first brace pivotally mounted to the second surface of said main table section proximate said first end for supporting said section on a rear bumper of an automobile;

a second brace pivotally mounted to said main table section proximate said second end and including two opposed legs pivotally mounted to a floor of a trunk of said automobile such that said main table section may be moved from a first, folded position wherein said second brace is disposed on said trunk floor, said main table section is disposed within its first surface proximate said trunk floor, and said first brace is disposed on said bottom surface of said table section, to a second, extended position wherein the first end of said main table section is supported over said bumper by said first brace and the second end is supported over said trunk floor by said second brace, the first surface of said main table section being exposed;

an auxiliary table section having first and second surfaces and pivotally mounted proximate an edge thereof to an edge of said main table section proximate said first end such that, in said first folded position, said main table section overlies said auxiliary table section with their respective first surfaces folded together, and in said second position, said auxiliary table section unfolds so that its first surface acts as an extension of the first surface of said main table surface; and a pair of slide supports slidingly disposed on the second surface of said main table section proximate side edges thereof, such that said slide supports extend to support a portion of said auxiliary table surface when said folding table is in said second position.

2. The folding table of claim 1 wherein said first brace includes a cross piece extending across said main table section and two opposed legs terminating in free ends, said free ends including means for engaging said bumper.

3. The folding table of claim 2 wherein at least one of said first and second braces further includes means for adjusting the lengths of the respective legs thereof.

4. The folding table of claim 3 wherein said first and second braces are tubular in construction and said means for adjusting includes two telescoping leg sections, one slidingly disposed inside the other, and means for fixing the relative positions of said telescoping leg sections with respect to each other.

5. The folding table of claim 1 further including means for pivotally mounting said second brace to said floor of said trunk.

6. The folding table of claim 5 wherein said means further includes a pair of U-shaped clamps mounted on said trunk floor.

7. The folding table of claim 6 wherein each of the pair of legs of said second brace terminates in a transverse section pivotally engageable in one of said pair of clamps.

8. A folding table for storage in the trunk of an automobile comprising:

a flat, main table section having first top and second bottom surfaces and first and second ends;

a first brace pivotally mounted to the second surface of said main table section proximate said first end for supporting said section on a rear bumper of an automobile;

a second brace pivotally mounted to said main table section proximate said second end and including two opposed legs pivotally mounted to a floor of a trunk of said automobile such that said main table section may be moved from a first, folded position wherein said second brace is disposed on said trunk floor, said main table section is disposed within its first surface proximate said trunk floor, and said first brace is disposed on said bottom surface of said table section, to a second, extended position wherein the first end of said main table section is supported over said bumper by said first brace and the second end is supported over said trunk floor by said second brace, the first surface of said main table section being exposed, wherein said second brace further includes an auxiliary brace having a cross pierce for engagement with the floor of the trunk and a pair of opposed legs extending from said cross pierce and pivotally mounted to respective legs of said second brace so as to support said second brace when said folding table is in said extended position.

9. The folding table of claim 8 wherein at least one of said first, second and auxiliary braces includes means for adjusting the lengths of the respective legs thereof.

10. The folding table of claim 9 wherein said first, second and auxiliary braces are tubular in construction and said means for adjusting includes two telescoping leg sections, one slidingly disposed inside the other, and means for fixing the relative positions of the telescoping leg sections with respect to each other.

11. A folding table for storage in the trunk of an automobile comprising:
   a flat, main table section having first top and second bottom surfaces and first and second ends;
   a first brace pivotally mounted to the second surface of said main table section proximate said first end for supporting said section on a rear bumper of an automobile;
   a second brace pivotally mounted to said main table section proximate said second end and including two opposed legs pivotally mounted to a floor of a trunk of said automobile such that said main table section may be moved from a first, folded position wherein said second brace is disposed on said trunk floor, said main table section is disposed within its first surface proximate said trunk floor, and said first brace is disposed on said bottom surface of said table section, to a second, extended position wherein the first end of said main table section is supported over said bumper by said first brace and the second end is supported over said trunk floor by said second brace, the first surface of said main table section being exposed; and
   a pair of releasable storage clamps mounted on one of said main and auxiliary table sections for fixing the relative positions of said main and auxiliary table sections with respect to each other.

* * * * *